(12) United States Patent
Park et al.

(10) Patent No.: US 11,530,470 B2
(45) Date of Patent: Dec. 20, 2022

(54) HIGHLY CORROSION-RESISTANT PLATED STEEL SHEET HAVING EXCELLENT PLATING ADHESION AND RESISTANCE TO LIQUID METAL EMBRITTLEMENT

(71) Applicant: POSCO, Pohang-si (KR)

(72) Inventors: Il-Jeong Park, Gwangyang-si (KR); Myung-Soo Kim, Gwangyang-si (KR); Suk-Kyu Lee, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 17/280,509

(22) PCT Filed: Sep. 20, 2019

(86) PCT No.: PCT/KR2019/012219
§ 371 (c)(1),
(2) Date: Mar. 26, 2021

(87) PCT Pub. No.: WO2020/067678
PCT Pub. Date: Apr. 2, 2020

(65) Prior Publication Data
US 2021/0340650 A1 Nov. 4, 2021

(30) Foreign Application Priority Data
Sep. 27, 2018 (KR) .................. 10-2018-0115244

(51) Int. Cl.
*C22C 38/06* (2006.01)
*C23C 2/06* (2006.01)
(Continued)

(52) U.S. Cl.
CPC ............ *C22C 38/06* (2013.01); *B32B 15/012* (2013.01); *B32B 15/04* (2013.01); *B32B 15/043* (2013.01);
(Continued)

(58) Field of Classification Search
CPC ......... C22C 38/06; C22C 21/10; C22C 21/18; C22C 21/02; C22C 21/04; C22C 21/06;
(Continued)

(56) References Cited

U.S. PATENT DOCUMENTS 6,635,359 B1 10/2003 Kurosaki et al.
2011/0274945 A1 11/2011 Shimoda et al.
(Continued)

FOREIGN PATENT DOCUMENTS

| CN | 105483594 | 4/2016 |
|---|---|---|
| CN | 107250418 | 10/2017 |

(Continued)

OTHER PUBLICATIONS

Machine Translation, Tokuda Kohei, JP 2017-066459, Apr. 2017. (Year: 2017).*

(Continued)

*Primary Examiner* — Michael E. La Villa
(74) *Attorney, Agent, or Firm* — Cantor Colburn LLP

(57) ABSTRACT

Provided is a highly corrosion-resistant plated steel sheet having plating adhesion and resistance to liquid metal embrittlement. A highly corrosion-resistant plated steel sheet comprises a base steel sheet and a plated layer, which sequentially comprises an Fe—Al alloy layer and an $MgZn_2$ layer from an interface with the base steel sheet.

10 Claims, 5 Drawing Sheets

(51) Int. Cl.
| | |
|---|---|
| *C23C 2/40* | (2006.01) |
| *C23C 2/26* | (2006.01) |
| *C23C 2/02* | (2006.01) |
| *C21D 9/46* | (2006.01) |
| *C23C 2/18* | (2006.01) |
| *C23C 28/02* | (2006.01) |
| *C23C 2/12* | (2006.01) |
| *C23C 2/14* | (2006.01) |
| *C23C 30/00* | (2006.01) |
| *C23C 28/00* | (2006.01) |
| *B32B 15/04* | (2006.01) |
| *B32B 15/18* | (2006.01) |
| *C22C 21/02* | (2006.01) |
| *C22C 21/18* | (2006.01) |
| *C22C 21/06* | (2006.01) |
| *C23C 2/04* | (2006.01) |
| *B32B 15/01* | (2006.01) |
| *C22C 21/04* | (2006.01) |
| *C23C 2/28* | (2006.01) |
| *C22C 21/10* | (2006.01) |

(52) U.S. Cl.
CPC ............... *B32B 15/18* (2013.01); *C21D 9/46* (2013.01); *C22C 21/02* (2013.01); *C22C 21/04* (2013.01); *C22C 21/06* (2013.01); *C22C 21/18* (2013.01); *C23C 2/02* (2013.01); *C23C 2/04* (2013.01); *C23C 2/06* (2013.01); *C23C 2/12* (2013.01); *C23C 2/14* (2013.01); *C23C 2/18* (2013.01); *C23C 2/26* (2013.01); *C23C 2/28* (2013.01); *C23C 2/40* (2013.01); *C23C 28/02* (2013.01); *C23C 28/021* (2013.01); *C23C 28/023* (2013.01); *C23C 28/321* (2013.01); *C23C 28/322* (2013.01); *C23C 30/00* (2013.01); *C23C 30/005* (2013.01); *C22C 21/10* (2013.01); *Y10T 428/12757* (2015.01); *Y10T 428/12785* (2015.01); *Y10T 428/12799* (2015.01); *Y10T 428/12972* (2015.01); *Y10T 428/2495* (2015.01); *Y10T 428/24942* (2015.01); *Y10T 428/24967* (2015.01); *Y10T 428/26* (2015.01); *Y10T 428/265* (2015.01)

(58) Field of Classification Search
CPC .. C22C 21/08; C21D 9/46; C23C 2/02; C23C 2/06; C23C 2/12; C23C 2/14; C23C 2/18; C23C 2/26; C23C 2/40; C23C 2/04; C23C 2/28; C23C 30/00; C23C 30/005; C23C 28/02; C23C 28/021; C23C 28/023; C23C 28/321; C23C 28/322; B32B 15/012; B32B 15/04; B32B 15/043; B32B 15/18; Y10T 428/12757; Y10T 428/12972; Y10T 428/12799; Y10T 428/12785; Y10T 428/24942; Y10T 428/24967; Y10T 428/26; Y10T 428/265
See application file for complete search history.

(56) References Cited

U.S. PATENT DOCUMENTS

| | | | |
|---|---|---|---|
| 2013/0183541 | A1* | 7/2013 | Kim ..................... B32B 15/013 427/349 |
| 2014/0037856 | A1 | 2/2014 | Moon et al. |
| 2018/0051366 | A1 | 2/2018 | Ooi et al. |
| 2018/0223386 | A1 | 8/2018 | Machado Amorim et al. |
| 2018/0237900 | A1 | 8/2018 | Kobayashi et al. |
| 2020/0002798 | A1 | 1/2020 | Tokuda et al. |

FOREIGN PATENT DOCUMENTS

| | | |
|---|---|---|
| JP | 2001323357 | 11/2001 |
| JP | 2002012959 | 1/2002 |
| JP | 2005264188 | 9/2005 |
| JP | 2010229483 | 10/2010 |
| JP | 2011214145 | 10/2011 |
| JP | 2016166414 | 9/2016 |
| JP | 2016166415 | 9/2016 |
| JP | 2017057502 | 3/2017 |
| JP | 2017066459 | 4/2017 |
| KR | 20020040771 | 5/2002 |
| KR | 20110060680 | 6/2011 |
| KR | 20110088573 | 8/2011 |
| KR | 20140129529 | 11/2014 |
| KR | 20150049991 | 5/2015 |
| KR | 20180030649 | 3/2018 |
| WO | 2008141398 | 11/2008 |
| WO | 2011065628 | 6/2011 |
| WO | 2012165838 A2 | 12/2012 |
| WO | 2018139620 A1 | 8/2018 |

OTHER PUBLICATIONS

EP Extended Search Report dated Dec. 7, 2021 re: Application No. PCT/KR2019/012219, pp. 1-10, citing: WO 2018/139620 A1, WO 2012/165838 A2 and US 2014/037856 A1.
International Search Report—PCT/KR2019/012219 dated Dec. 30, 2019.
Chinese Office Action—Chinese Application No. 201980063879.5 dated Sep. 2, 2022, citing JP 2002-012959, WO 2012/165838, JP 2010-229483, JP 2001-323357, JP 2011-214145, JP 2016-166414, JP 2017-066459, US 2018-0223386, and CN 107250418.

* cited by examiner

| INVENTIVE EXAMPLE 1 | INVENTIVE EXAMPLE 2 | INVENTIVE EXAMPLE 3 | INVENTIVE EXAMPLE 4 | INVENTIVE EXAMPLE 5 |
|---|---|---|---|---|
|  |  |  |  |  |
| NOT SEPARATED | NOT SEPARATED | NOT SEPARATED | NOT SEPARATED | NOT SEPARATED |
| COMPARATIVE EXAMPLE 4-1 | COMPARATIVE EXAMPLE 5-1 | COMPARATIVE EXAMPLE 5-5 | COMPARATIVE EXAMPLE 6 | |
|  |  |  |  | |
| SEPARATED | SEPARATED | SEPARATED | SEPARATED | |

HIGHLY CORROSION-RESISTANT PLATED STEEL SHEET HAVING EXCELLENT PLATING ADHESION AND RESISTANCE TO LIQUID METAL EMBRITTLEMENT

TECHNICAL FIELD

The present disclosure relates to a highly corrosion-resistant plated steel sheet having plating adhesion and excellent resistance to liquid metal embrittlement and.

BACKGROUND ART

With recent increasing interest in reduced weight and improved safety in vehicles, high-strength steel sheets for vehicles having strength of 900 MPa or more have been in the spotlight. To satisfy such demand, high-strength steel sheets including elements such as carbon (C), silicon (Si), manganese (Mn), aluminum (Al), titanium (Ti), chromium (Cr), and the like in a large amount, have recently been developed.

In addition, such high-strength steel sheets are often required to have high corrosion resistance as well, so that various plated steel sheets, respectively having surfaces on which plating is performed, have been proposed. In the case of aluminum-base plated steel sheets accounting for a majority of plated steel sheets, low corrosion resistance has been pointed out because sacrificial protection against corrosion of a plating layer is lower than that of a zinc plated steel sheet.

To address the above issue, Patent Documents 1 and 2 have proposed steel materials having corrosion resistance improved by adding zinc (Zn), magnesium (Mg), and the like, to an aluminum plating layer. Specifically, Patent Document 1 discloses alloy plating performed using a steel material including, by weight, Al contained in an amount of 25 to 85%, Si contained in an amount of 0.5% or more to 10% or less of the content of Al, and the balance of Zn. Patent Document 2 discloses a technology to improve corrosion resistance by performing alloy plating including, by wt %, 25 to 75% of Al, 0.1 to 10% of Mg, 1 to 7.5% of Si, 0.05 to 5% of Cr, and the balance of Zn.

However, when plating is performed with the plating compositions disclosed in Patent Documents 1 and 2, dross may be generated in a plating bath. To prevent generation of the dross, the plating bath should be maintained at a high temperature, resulting in property deterioration of a steel sheet. In addition, when a large amount of Zn is included, a liquefied metal may permeate into a grain boundary to cause liquid metal embrittlement inducing cracking. When Mg is included as disclosed in Patent Document 2, plating adhesion may be reduced.

PRIOR ART DOCUMENT

Patent Documents (Patent Document 1) Japanese Patent Publication Laid-Open No. 2005-264188

(Patent Document 2) Korean Patent Publication No. 2011-0088573

DISCLOSURE

Technical Problem

An aspect of the present disclosure is to provide a plated steel sheet having excellent plating adhesion and resistance to liquid metal embrittlement as well as sufficient corrosion resistance.

The present invention is not limited to solving the above problem. A person skilled in the art would not have any difficulty to grasp additional problems to be solved by the present invention.

Technical Solution

According to an aspect of the present disclosure, a highly corrosion-resistant plated steel sheet includes: a base steel sheet; and a plating layer including an Fe—Al alloy layer and an $MgZn_2$ layer sequentially from an interface with the base steel sheet.

According to another aspect of the present disclosure, a method of manufacturing a highly corrosion-resistant plated steel sheet includes: preparing a base steel sheet; heating the base steel sheet to a temperature of 700° C. to 1050° C.; dipping the base steel sheet into an aluminum-based plating bath, maintained at a temperature of 530° C. to 750° C., to obtain an aluminum-base plated steel sheet; adjusting a coating weight of the obtained aluminum-base plated steel sheet; cooling the aluminum-base plated steel sheet to a temperature of 350° C. at a cooling rate of 7 to 25° C./sec; and cooling the aluminum-base plated steel sheet from the temperature of 350° C. to a temperature of 80° C. at a cooling rate of 5 to 15° C./sec.

The technical solutions to the above-mentioned problems do not fully enumerate all features of the present disclosure. Various features of the present disclosure and the resulting advantages and effects will be understood in more detail with reference to the following detailed examples.

Advantageous Effects

As described above, an alloy phase formed on an interface between a plating layer and a base steel sheet and in the plating layer may be appropriately controlled to improve plating adhesion and resistance to liquid metal embrittlement while maintaining excellent corrosion resistance.

BEST MODE FOR INVENTION

Figure 1:
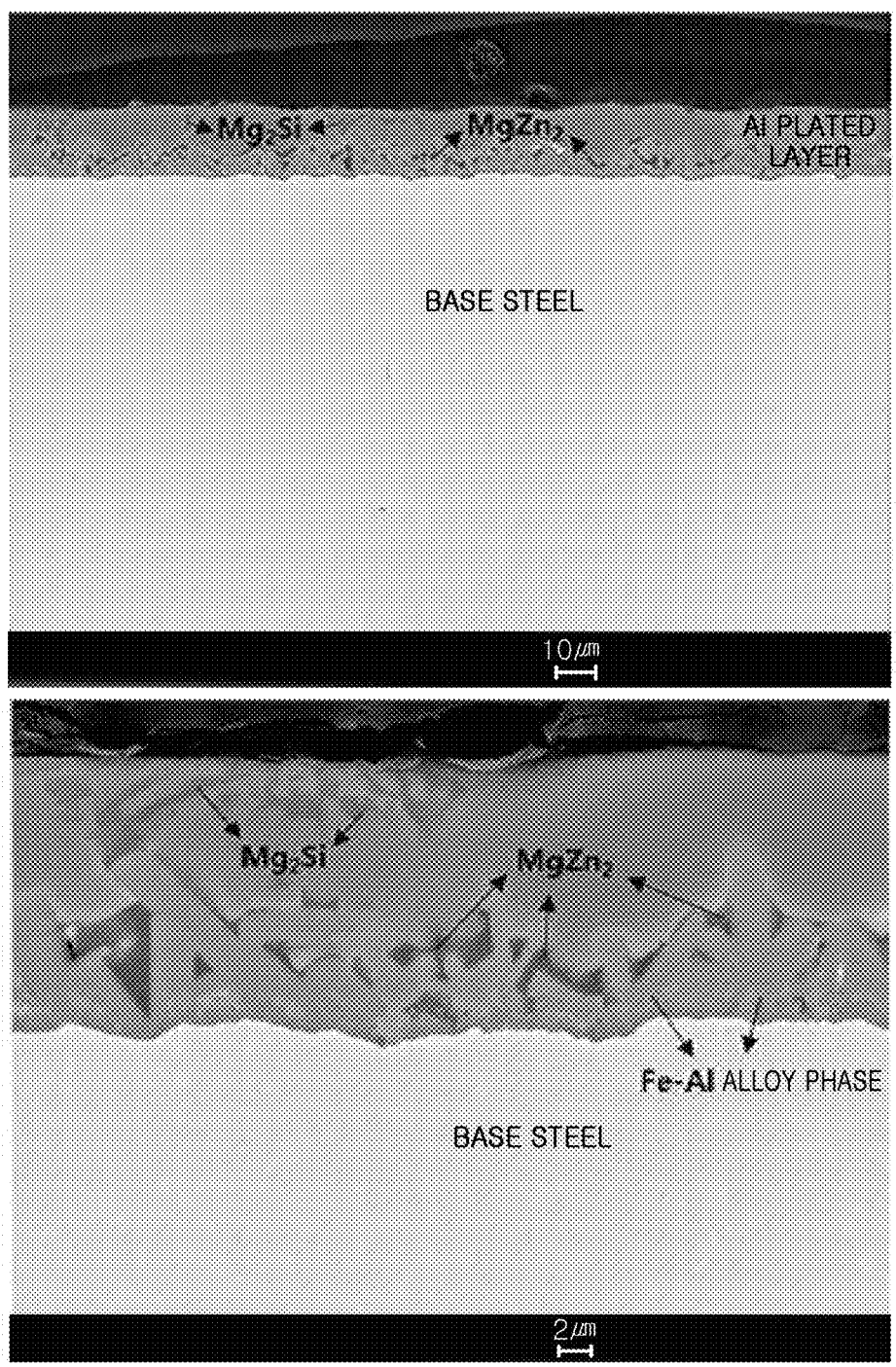
FIG. 1 is a scanning electron microscope (SEM) image, illustrating a cross-section of an aluminum-based hot-dip plated steel sheet manufactured based on Inventive Example 3, in which an upper portion illustrates a result of observation at low magnification and a lower portion illustrates a result of observation at high magnification.

Hereinafter, the present disclosure will be described in detail.

The present inventors have found that when adding an alloy component such as Zn or Mg to a plating layer of a plated steel sheet, in particular, an aluminum-based plating sheet and controlling alloy layer formed thereby, sacrificial protection against corrosion can be improved, propagation of corrosion can be inhibited, and resistance to liquid metal embrittlement can also be improved and, in some cases, plating adhesion can also be improved. Based on the findings, the present inventors completed the present disclosure.

Liquid metal embrittlement (simply referred to as "LME") is a phenomenon in which a plating layer is melted at high temperature and a metal of the melted plating layer permeates into a grain boundary of a base steel sheet to cause cracking.

The present inventors have found that when a plating layer of a plated steel sheet has a composition containing Zn, Mg, Si, and like, and conditions of respective layers included in the plating layer are appropriately controlled, welding liquid metal embrittlement can be improved.

That is, the plating layer of the present disclosure may include several divided layers. Among the divided layers, a layer having an Fe—Al alloy phase is disposed in a portion closest to a base steel sheet, for example, an interface between the plating layer and the base steel sheet. Such an Fe—Al alloy layer may mainly have an $Fe_2Al_5$ or $FeAl_3$ phase, but is not limited thereto. In the case in which the Fe—Al alloy layer is present at the interface between the base steel sheet and the plating layer, even when Zn of the plating layer is melted due to high temperature during welding, a contact between the molten metal and the steel sheet may be blocked to effectively prevent liquid metal embrittlement from occurring. In the present disclosure, the term "Fe—Al alloy" does not necessarily refer to an alloy including only Fe and Al and excluding the other elements. Therefore, even when some of additional elements included in a plating bath or a base steel sheet are included, any alloy in which the total content of Fe and Al is 70% or more may be regarded as an Fe—Al alloy. In this regard, a thickness of an Fe—Al alloy phase may be set to 1 µm or more in an example embodiment. On the other hand, even when the Fe—Al alloy has a significantly large thickness, plating adhesion may be reduced due to characteristics of an Fe—Al phase which is a hard phase. Therefore, the thickness of the Fe—Al alloy layer may be limited to 8 µm or less in an example embodiment.

However, only formation of the Fe—Al alloy layer may be insufficient to secure resistance to liquid metal embrittlement.

Therefore, in an example embodiment, an $MgZn_2$ layer may be formed directly on the Fe—Al alloy layer. As can be seen from FIG. 1, the Fe—Al phase may have an irregular shape (in particular, on a surface opposing a surface in contact with the steel sheet), but an $MgZn_2$ phase may be in contact with the Fe—Al phase to be formed on the Fe—Al phase.

When the $MgZn_2$ alloy phase is present in the plating layer, a proportion of a single phase of Zn in the plating layer may be reduced and a contact between Zn and the base steel sheet may be interrupted even when the plating layer is liquefied during welding. Thus, liquid metal embrittlement may be prevented.

In an example embodiment, to obtain the above effect, a mean thickness on $MgZn_2$ may be 0.5 µm or more and, in significantly more detail, 1 µm or more. In an example embodiment, the thickness of the $MgZn_2$ layer may be measured in a direction, perpendicular to an interface with the alloy layer (the Fe—Al layer) in contact with the $MgZn_2$ layer. The thickness of the $MgZn_2$ layer is measured 10 times at an interval of 3 µm based on the length of the interface between the steel sheet and the Fe—Al phase and values of the 10-times measurements are averaged to determine a one-time mean thickness, and thicknesses of the respective times are obtained by measuring thicknesses five times depending on positions and are then averaged to determine a final thickness. However, when the thickness is significantly large, workability of the plating layer may be deteriorated. Therefore, a mean thickness of the layer including the $MgZn_2$ phase may be set to 3.5 µm or less. In some cases, the mean thickness may be set to 2.5 µm or less.

In addition, since the above-mentioned effect may be obtained when MgZn2 has a large area while being in contact with a portion directly on the Fe—Al phase, a proportion of the $MgZn_2$ phase directly on the Fe—Al alloy phase in the plating layer may be 90% or more. The above proportion may be determined as a ratio of an area of the $MgZn_2$ phase to an overall area when a layer formed to be upper than $MgZn_2$ (for example, an Al alloy layer) is removed and observed. Since it was confirmed that $MgZn_2$ formed with a large area is disposed directly on the Fe—Al alloy phase, MgZn2 may be considered to be formed while being in contact with a portion directly on the Fe—Al alloy phase in the present disclosure without checking whether another phase is included in a space between $MgZn_2$ and the Fe—Al alloy phase.

An Al alloy layer may be formed on an upper side of the above-mentioned $MgZn_2$ layer (referring to a side distant from the base steel sheet). In the present disclosure, the Al alloy layer is mainly originated from components of the plating bath, and refers to an upper layer except for an Fe—Al alloy layer formed by an alloying reaction of Al with the base steel sheet and an $MgZn_2$ layer formed thereon. In addition, the Al alloy layer refers to an alloy layer having a composition including Alas a main component and further including elements originated from the plating bath. However, the present disclosure does not exclude the fact that the Al alloy layer may further include a small amount of elements originated from the base steel sheet which may be diffused from the base steel sheet.

Accordingly, the plating layer of the plated steel sheet according to the present disclosure may include an Fe—Al alloy layer, an $MgZn_2$ layer, and an Al alloy layer sequentially from the interface with the base steel sheet.

In addition, when a typical aluminum-base plated steel sheet includes Mg and Si, an $Mg_2Si$ phase may be formed. The $Mg_2Si$ phase may serve to improve corrosion resistance of a plating layer, but may reduce adhesion to a steel sheet as well as a hard phase, causing plating adhesion to be reduced when the $Mg_2Si$ phase is formed on an interface between the base steel sheet and the plating layer. Therefore, it is needed to control the $Mg_2Si$ phase to form at a upper portion of the plating layer.

Accordingly, in another example embodiment, an area-based proportion of $Mg_2Si$ in the plating layer may be set to 10% or less. In this case, the proportion of $Mg_2Si$ in the plating layer may be determined as a ratio of an area of the $Mg_2Si$ phase to an overall area of the plating layer when the plated steel sheet is cut and a cut surface thereof is observed. When the proportion of the area of the $Mg_2Si$ phase is significantly high, a proportion of $Mg_2Si$ formed on the interface with the steel sheet may be increased, or brittleness of the entire plating layer may be increased, resulting in separation of the plating layer. Therefore, the proportion of the area of the $Mg_2Si$ phase is limited to 10% or less. In some cases, the proportion of the area of the $Mg_2Si$ phase may be set to 8% or less. In the present disclosure, a lower limit of the proportion of the $Mg_2Si$ phase for ensuring the plating adhesion is not limited but, in an example embodiment, an area-based proportion of the $Mg_2Si$ phase may be set to 3% or more in additional consideration of corrosion resistance because the $Mg_2Si$ phase may attribute to improvement of corrosion resistance of the plating layer. In some cases, the proportion of the $Mg_2Si$ phase may be set to 5% or more.

In addition, it is advantageous that the $Mg_2Si$ phase is dispersed in an upper layer (referring to an upper portion excluding the Fe—Al alloy layer and the $MgZn_2$ phase formed directly thereon) in the plating layer as much as possible. To this end, a mean size of the $Mg_2Si$ phase (a mean of lengths of major axes of particle) may be 6 µm or less (excluding 0 µm). In terms of preventing separation of the plating layer, the smaller the mean size, the more advantageous it is, so that the lower limit of the size is not set. However, since $Mg_2Si$ having a certain level or more of size may also contribute to the improvement of corrosion resistance, the mean size of the $Mg_2Si$ phase may be set to 3 µm or more in an example embodiment. For the purpose of the present disclosure, $Mg_2Si$ particles, which are continuous and are not separated by another phase, may be regarded as a single particle and a mean size thereof may be measured. As described above, $Mg_2Si$ is present in the form of being dispersed rather than being formed as an additional layer. Therefore, $Mg_2Si$ is not expressed as a particularly distinguished layer.

In an example embodiment, a proportion of an area of the $Mg_2Si$ phase in contact with the Fe—Al phase (a ratio of an area of the $Mg_2Si$ phase in contact with Fe—Al to an area of the base steel sheet) may be 2% or less. As $Mg_2Si$ phases in contact with Fe—Al is increased, an area in which the $MgZn_2$ phase is in contact with the base steel sheet may be decreased to diminish plating adhesion and resistance to liquid metal embrittlement. Therefore, the proportion is limited to 2% or less. The proportion may be determined as a ratio of an area of the $MgZn_2$ phase to an overall area when a layer formed to be upper than $Mg_2Si$ in contact with the Fe—Al phase (for example, the Al alloy layer) is removed and observed.

According to an example embodiment, the aluminum-based plating layer may include, by weight, 5 to 10% of silicon (Si), 5 to 30% of zinc (Zn), and 1 to 7% of magnesium (Mg). The reason why the plating layer has the above composition will be described in brief. In the present disclosure, it should be noted that the content of each element included in the plating layer and the base steel sheet is expressed by wt % unless specifically defined otherwise. In the present disclosure, the term "aluminum-based plating layer" refers to a concept including all the individual layers, as described above. It also should be noted that a composition of an aluminum plating layer refers to an average composition obtained by simultaneously analyzing compositions of the above-described layers.

Silicon (Si): 5 to 10%

Si is advantageous for lowering a melting point through formation of an Al alloy and lowering a melting point of an aluminum ingot by the addition of Si such that a temperature of the plating bath is managed to be low. When the temperature of the plating bath is reduced to be low, the amount of solid dross, generated by chemical bonding between Al and Fe eluted in the plating bath and components of the composition of the plating bath, may be reduced. Therefore, in an example embodiment, the content of Si may be limited to 5% or more. However, when the content of Si of the plating layer is greater than 10%, the content of Si of the plating bath may also be increased. As a result, a temperature of the plating bath of the Al alloy may be increased again. In addition, Si is not dissolved in a solid Al matrix and forms an acicular Si phase to easily form a secondary phase such as $Mg_2Si$. Therefore, formability of the plating layer may be deteriorated and adhesion of the plating layer may be reduced when the content of Si is high. For this reason, the content of Si should be appropriately controlled. However, when the content of Si is 5% or less, the function of Si to suppress the formation of the Fe—Al alloy phase in the plating layer is decreased to result in an excessive fraction of the Fe—Al alloy phase. Therefore, the content of Si needs to be controlled. The content of Si in the plating layer may be limited to, in further detail, 6 to 9%.

Zinc (Zn): 5 to 30%

Zn lowers a melting point of the plating bath and acts as sacrificial protection against corrosion in which Zn is oxidized or corroded prior to the base steel sheet in a corrosive environment comparing with Aluminum. Since Al itself does not have sacrificial protection capability, it may be difficult to secure sacrificial protection against corrosion when the content of Zn is less than 5%. In addition, when the content of Zn is low, it may be difficult to form an Mg—Zn alloy phase. However, when the content of Zn is greater than 30%, liquid metal embrittlement (LME) may occur during welding, and oxides may be easily formed in the plating bath during plating to cause defects of the steel sheet after welding. Therefore, in an example embodiment, the content of Zn may be limited to 5 to 30%. In an example embodiment, the content of Zn may be limited to, in further detail, 15 to 25%.

Magnesium (Mg): 1 to 7%

Mg also lowers the melting point of the plating bath. Similarly to Zn, Mg is an element having high oxygen affinity and has a characteristic of sacrificial protection against corrosion in which Mg is oxidized or corroded fast in the corrosion environment comparing with Al. Mg may play the same role as Zn, but may exhibit more effective sacrificial protection against corrosion than Zn even when the content of Mg is low. Therefore, the content of Mg may be limited to 1% or more to obtain sufficient sacrificial protection while reducing a risk of LME caused by Zn. When the content of Mg is excessive, dross, a product of generation of an oxide in the plating bath, may be generated due to high oxygen affinity of Mg. The dross may result in a dent defect of the steel sheet after plating. Due to the high affinity with Si, Mg may form a secondary phase such as $Mg_2Si$ to reduce the adhesion of the plating layer. In this regard, in an example embodiment, an upper limit of the content of Mg may be limited to 7%. In an example embodiment, the content of Mg may be, in detail, 1.5 to 5%.

In an example embodiment, the plating layer may include a balance of Al and inevitable impurities. In addition, the plating layer may further include beryllium (Be) and strontium (Sr) in amounts limited below, as necessary.

Beryllium (Be) and Strontium (Sr): 0.5% or Less in Total

Be and Sr are elements having high oxidizing power. When at least one of Be and Sr is included in the plating bath, oxide coating of Be and Sr may be formed on a surface of the plating bath to reduce the amount of ash formed due to evaporation of the plating bath. In addition, since these elements may also form an oxide layer of Be and Sr on a surface of the plating layer to stabilize the surface, they may be added in small amounts. However, when the contents of Be and Sr are significantly high, an oxide of these elements may be excessively formed in the plating bath to cause a defect. In addition, since costs for adding the elements may be increased, the sum of the contents of Be and Sr may be limited to 0.5% or less in an example embodiment. These elements, satisfying the above composition range, may be present as impurities.

Impurities, included in the plating layer, may include Mn, P, S, Cu, Co, Ca, Na, V, Ga, Ge, As, Se, In, Ag, W, Pb, and the like, originated from a steel sheet or an ingot, a raw material for manufacturing a plating bath. Even when each of the above impurities is included in an amount of less than 0.1%, it is within the scope of the present disclosure. In addition, iron (Fe) may also be contained in the plating bath or the plating bath from the base steel sheet, and an allowable content of Fe may be about 5% or less.

In the present disclosure, the type of base steel sheet is not limited. However, a steel sheet having a tensile strength of 1.0 GPa or more may more sensitive to liquid metal embrittlement. Therefore, in an example embodiment, when a steel sheet having a tensile strength of 1.0 GPa or more is used as a base steel sheet, effects of the plating layer of the present disclosure having high resistance to liquid metal embrittlement may be reliably obtained.

In addition, according to an example embodiment, the plated steel sheet may have a tensile strength of 80% or more, as compared with a tensile strength of the base steel sheet before plating. For example, the plated steel sheet of the present disclosure may be plated at a low plating bath temperature of 700° C. or less, a temperature at which the composition of the plating bath may significantly reduce generation of dross even at a low temperature. Accordingly, since the steel sheet does not need to be heated at a high temperature, deterioration of material properties of the steel sheet may be minimized.

A method of manufacturing a plated steel sheet according to the present disclosure is not limited as long as the above-described conditions can be implemented. Hereinafter, a non-limiting example of manufacturing the plated steel sheet according to the present disclosure will be described.

A method of manufacturing a plated steel sheet may include: preparing a base steel sheet; heating the base steel sheet to a temperature of 700° C. to 1050° C.; dipping the base steel sheet into an aluminum-based plating bath, maintained at a temperature of 530° C. to 750° C., to obtain an aluminum-base plated steel sheet; adjusting a coating weight of the obtained aluminum-base plated steel sheet; cooling the aluminum-base plated steel sheet to a temperature of 350° C. at a cooling rate of 7 to 25° C./sec; and cooling the aluminum-base plated steel sheet from the temperature of 350° C. to a temperature of 80° C. at a cooling rate of 5 to 15° C./sec.

In this case, a temperature at which the steel sheet enters the plating bath may be adjusted to be a plating bath temperature minus 20° C. to the plating bath temperature plus 50° C. According to an example embodiment, the coating weight during the plating may be controlled to be 20 to 90 g/m$^2$ based on one side surface. Hereinafter, the method will be described depending on each of the conditions.

Heating Temperature of Base Steel Sheet: 700 to 1050° C.

Before plating the base steel sheet, the base steel sheet may be heated to the above-described temperature range. For example, in the case of high-strength steel, strength needs to be secured through a heat treatment at a temperature of two phase region and surface cleanness needs to be secured through a reduction heat treatment. To this end, the steel sheet needs to be heated to the above-described temperature range. The temperature range may be, in further detail, 750° C. to 1000° C.

Temperature of Plating Bath: 530 to 750° C.

The temperature of the plating bath is limited to 530° C. to 750° C. When the temperature of the plating bath is less than 530° C., viscosity of aluminum may be increased to degrade drivability of a roll in the plating bath. When the temperature of the plating bath is higher than 750° C., the amount of ash formed by evaporation of the plating bath and the amount of dross generated due to bonding between Fe and Al in the plating path may be increased. In addition, in the case of high-strength steel accompanying phase transformation, high-temperature deterioration of properties may occur at a high temperature to induce a change in mechanical properties. In an example embodiment, the temperature of the plating bath may be limited to 700° C. or less to 600° C. or less to prevent a decrease in the strength of the high-strength steel.

Plating Bath Inlet temperature of Steel Sheet: Plating Bath Temperature minus 20° C. to Plating Bath Temperature plus 50° C.

When the inlet temperature of the steel sheet is lower than the plating bath temperature minus 20° C., wettability of molten aluminum may be reduced. When the inlet temperature of the steel sheet is greater than the plating bath temperature plus 50° C., the plating bath temperature may be locally increased, so that it may be difficult to control the plating bath temperature.

Adjustment of Coating Weight after Plating

In Al-based plating including Si, Zn, and Mg as in the present disclosure, attention is required during adjustment of coating weight using an air knife because cooling rates of solid-solute elements or alloy phases are different from each other. In other words, to obtain an advantageous configuration of an alloy layer to be implemented in the present disclosure, it is advantageous to adjust a coating weight using an air knife in two steps. That is, when an initial solidification rate, at which the plating layer is solidified, is low, various phases may be formed in the plating layer to cause partial non-plating. In an example embodiment, to avoid such an issue, when a temperature of the steel sheet is deceased within the range of 530° C. to 500° C., an air knife for adjusting the coating weight approaches the steel sheet and gas is blown toward the steel sheet at high speed to rapidly solidify the plating layer. For example, in an example embodiment, a distance between the steel sheet and the air knife may be adjusted to 6 mm to 10 mm to the above temperature, and linear velocity of gas discharged from the air knife may be rapidly adjusted to 150 m/sec to 250 m/sec, in detail, 180 m/sec to 220 m/sec. Afterwards, to precisely adjust the coating weight, the distance between the steel sheet and the air knife may be adjusted within 10 mm to 14 mm, and the amount of gas to be blown may be adjusted to 30 m/sec to 70 m/sec.

Cooling to 350° C. at Rate of 7 to 25° C./Sec

To form an appropriate amount of Mg$_2$Si phase in the plating layer, it is necessary to form Mg$_2$Si before an Fe component of the base steel sheet is diffused to the plating layer. To this end, it is necessary to cool the plated steel sheet at a cooling rate of 7° C./sec or more and, in detail, at a cooling rate of 10° C./sec or more. In an example embodiment, cooling for inhibiting the Fe diffusion to form the $Mg_2Si$ phase in the plating layer may be controlled to 350° C. When the cooling rate is high, a phase similar to an amorphous phase, other than the $Mg_2Si$ phase, may be formed. Therefore, to smoothly form the $Mg_2Si$ phase, the cooling rate may be limited to 25° C./sec or less, in detail, 20° C./sec, and, in further detail, 15° C./sec or less. As necessary, a process of adjusting the coating weight may be performed before initiation of cooling after plating. In such a case, the cooling rate refers to a cooling rate to 350° C. since the coating weight was adjusted. When the coating weight is not adjusted, the cooling rate may refer to a cooling rate to 350° C. from a point in time of being removed from the plating bath. In an example embodiment, the coating weight may be adjusted using an air knife. In such a case, a cooling rate of the present step may be a cooling rate to 350° C. immediately after the air knife. The cooling rate refers to a mean cooling rate between a temperature at a point in time of calculating a cooling rate (for example, a temperature immediately after an air knife when the air knife is used, and a temperature at a point in time of being removed from the plating bath when the air knife is not used) and 350° C.

Cooling from 350° C. to 80° C. at Cooling Rate of 5 to 15° C./Sec

In addition, in an example embodiment, the cooling rate from 350° C. to 80° C. may be controlled to be 5 to 15° C./sec. In the above-described cooling rate range, an $MgZn_2$ phase may be continuously formed directly on an Fe—Al alloy layer. When the cooling rate in the temperature range is significantly high, it may be difficult to continuously form the $MgZn_2$ phase, a type of a non-equilibrium phase, so that the cooling rate may be limited to 15° C./sec or less. When the cooling rate is significantly low, a large amount of an unwanted secondary phase such as $Mg_2Si$ may be formed in the plating layer to impede growth of the $MgZn_2$ phase, so that the cooling rate may be limited to 5° C./sec or higher. It should be noted that in the present disclosure, the cooling rate is a mean cooling rate in a corresponding temperature region. Therefore, cooling may be performed at a high cooling rate even in some temperature regions of 350° C. or less, and the above conditions are considered to be satisfied when the mean cooling rate only falls within the above-described range. In addition, a difference in physical properties of the steel sheet depending on a cooling rate is not great within the temperature range of less than 80° C., so that the cooling rate is not limited in an example embodiment.

According to an example embodiment, a cooling rate in the step of performing cooling to 350° C. after adjusting the coating weight may be higher than the cooling rate from 350° C. to 80° C. This is aimed at inducing dispersion and formation of the $Mg_2Si$ phase by allowing a cooling rate of previous cooling to be relatively high and at forming a continuous $MgZn_2$ phase by allowing a cooling rate of subsequent cooling to be relatively low.

Components of Plating Bath

The components of the plating bath of the present disclosure are substantially the same as the plating layer. However, since Fe in the plating layer may be increased by 1% to 2% during alloying with the base steel sheet after plating, a content of Fe in the plating bath is 1% to 2% lower than a content of Fe in the plating layer. A content of Fe in a plating bath used in an example embodiment may be 4% or less, and may be 0.5% to 3% in another example embodiment.

MODE FOR INVENTION

Hereinafter, the present disclosure will be described in more detail with reference to Examples. It should be noted, however, that the embodiments described below are for the purpose of illustrating the present disclosure and are not intended to limit the scope of the present disclosure, since the scope of the present disclosure is determined by the matters described in the claims and matters able to be reasonably deduced therefrom.

Examples

A base steel sheet (having a strength of 1.2 GPa) was prepared, heated to 950° C. using a continuous annealing furnace, and then dipped into an aluminum-based plating bath disclosed in Table 1, to perform aluminum-based plating (the other elements, not listed in Table 1 in all embodiments except for Inventive Examples 5, 6, and 7, is Al 0.1% or less of impurities, 20 ppm of Be and 40 ppm of Sr; Inventive Examples 5, 6 and 7 were different from the other examples in that in Inventive Example 5, only 20 ppm of Sr was added; in Inventive Example 6, only 40 ppm of Sr was added; in Inventive Example 7, both Be and Sr were not added). A temperature of a plating bath and a temperature of a steel sheet, entering the plating bath, were adjusted as listed in Table 1. An air knife was used for all steel sheets, removed from the plating bath, to adjust a coating weight to be 60 g/m², and then, a mean cooling rate to 350° C. and a subsequent cooling rate from 350° C. to 80° C. were controlled to obtain a plated steel sheet as described in Table 1. When the coating weight was adjusted using the air knife, a distance between the air knife and the steel sheet was adjusted to be 8 mm until a temperature of the steel sheet reached 540° C., and then, a distance between the air knife and the steel sheet was adjusted to be 12 mm and linear velocity of gas was adjusted to be 50 m/sec. A composition (contents of Si, Zn, Mg, Be, Sr, and impurities) of a plating layer of the obtained steel sheet was substantially the same as a composition of the plating bath, except for Fe. In addition, a content of Fe was increased (picked up) by about 1% (a content of Al is a remnant except for added elements and impurities). In addition, it was confirmed that the plating layer of the obtained plated steel sheet included an Fe—Al alloy layer, an $MgZn_2$ alloy layer, and an Al alloy layer sequentially stacked from an interface with a base steel sheet and an $Mg_2Si$ phase was present in the form of particles, in all of the inventive examples and the comparative examples.

A mean thickness of an $MgZn2$ phase formed in a plating layer and a proportion of the $MgZn_2$ phase in a surface directly on Fe—Al are listed in Table 2. In addition, a fraction of $Mg_2Si$ in the plating layer and a mean size of an $Mg_2Si$ phase are listed in Table 2. Since an $Fe_2Al_5$ phase or an $FeAl_3$ phase accounted for an entire interface between a plating layer and a base steel sheet, area ratios of the $MgZn_2$ phase and the $Mg_2Si$ in contact with base steel were both 0%. A thickness and a fraction of the $MgZn_2$ phase and a fraction of the $Mg_2Si$ phase were measured in the following manner.

Measurement of Thickness of $MgZn_2$

After plating, a cross-section of a specimen was observed using a scanning electron microscope (SEM), and then phases were identified through energy dispersion spectroscopy (EDS). The thickness of the MgZn$_2$ layer was measured in a direction, perpendicular to an interface with an alloy layer (an Fe—Al layer) in contact with the MgZn$_2$ layer, 10 times at an interval of 3 μm and values of the 10-time measurements were averaged to determine a one-time mean thickness, and the mean thicknesses were obtained five times and averaged to be final thickness.

Measurement of Size of Mg$_2$Si

After plating, a cross-section of a specimen was observed using an SEM, and then phases were identified through EDS. Then, ten or more images of each specimen were secured, and a size of a major axis of a corresponding phase (particles) was measured and a mean was then used.

Measurement of Fraction of MgZn$_2$ (Ratio of MgZn$_2$ Directly on Fe—Al Alloy Phase)

The fraction was determined as a ratio of an MgZn$_2$ phase to an overall area when an Al alloy layer, formed in an uppermost portion of a plating layer, was removed and observed. Through cross-section analysis, or the like, it was confirmed that no phase was present between the observed MgZn$_2$ phase and the Fe—Al alloy phase.

Measurement of Fraction of Mg$_2$Si in Plating Layer

After plating, cross-section of a specimen was observed using an SEM, and then phases were identified through EDS. Then, ten or more images of each specimen were secured, a fraction of a corresponding phase was obtained through image analysis software, and then a mean was used.

Area Ratio of Mg$_2$Si in Contact with Fe—Al Phase

The area ratio was determined as a ratio of an area of an MgZn$_2$ to an overall area when an Al alloy layer, formed in an uppermost portion of a plating layer, was removed and observed.

Figure 5:
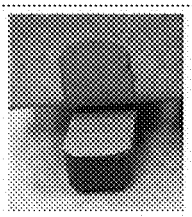
FIG. 5 is an image of observing results obtained by performing plating adhesion experiments on Inventive Examples and Comparative Examples.
Figure 5:
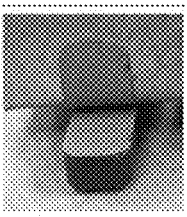
Figure 5:
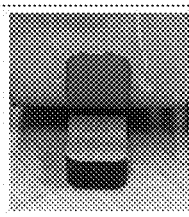
Figure 5:
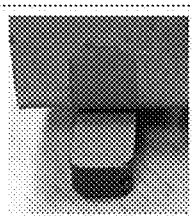
Figure 5:
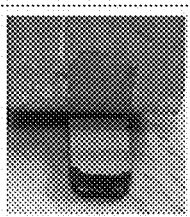
Figure 5:
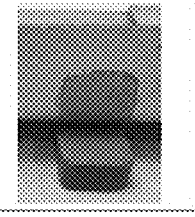
Figure 5:
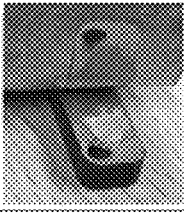
Figure 5:
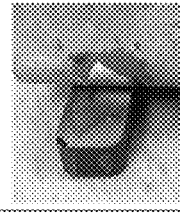
Figure 5:
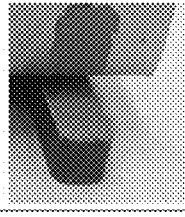

For the plated steel sheet obtained through the above processes, evaluations was made as to whether liquid metal embrittlement (LME) occurred, plating adhesion, a change in tensile strength after plating, corrosion resistance, and the like, based on the following criteria and then results thereof are illustrated in FIG. 5.

Evaluation of LME

Point welding was performed based on ISO 18278-2 standard, and welding current was set to 0.5 kA lower than expulsion current. After the welding, a cross-section of the steel sheet was observed using an OM or SEM to determine whether LME cracking of a corresponding specimen occurred, through determining whether cracking occurred in a heat-affected zone.

Evaluation of Plating Adhesion

Adhesive for automotive structures was applied to a surface of the steel sheet, then dried and solidified, and bent to 90 degrees for the adhesive to be separated from the steel sheet. Plating adhesion was evaluated by determining whether the plating layer was separated to be stained with the adhesive. A good state, in which the plating layer was not separated and was not stained with the adhesive, was expressed as "not separated," and a poor state, in which the plating layer was separated and stained with the adhesive, was expressed as "separated."

Evaluation of Mechanical Properties

A change in tensile strength was measured by performing a tensile test on an aluminum-plated specimen at a strain rate of $10^{-2}$/sec. In addition, a non-plated cold-pressed steel sheet (CR) specimen was subjected to the same tensile test. Results of the tensile tests were compared with each other.

Good (Tensile Strength of Plated Material/Tensile Strength of CR Material=0.80 or more)

Poor (Tensile Strength of Plated Material/Tensile Strength of CR Material=less than 0.80)

Evaluation of Corrosion Resistance

A salt spray test (SST) was performed in 3.5% of NaCl solution, and then corrosion resistance was determined as time required until red rust occurred.

Excellent: more than 2000 h

Normal: between 1000 h and 2000 h

Poor: less than 1000 h

TABLE 1

| | C of PB (wt %) | | | T of PB (° C.) | ET of SS (° C.) | CR to 350° C. (° C./s) | CR from 350° C. to 80° C. (° C./s) |
|---|---|---|---|---|---|---|---|
| | Si | Zn | Mg | | | | |
| CE 1 | 1 | 20 | 3 | 663 | 660 | 15 | 10 |
| CE 2 | 1 | 20 | 5 | 651 | 650 | 15 | 10 |
| CE 3 | 1 | 40 | 5 | 620 | 620 | 15 | 10 |
| IE 1 | 5 | 20 | 3 | 585 | 580 | 15 | 10 |
| CE 4-1 | 5 | 20 | 3 | 585 | 580 | 15 | 20 |
| CE 4-2 | 5 | 20 | 3 | 585 | 580 | 30 | 10 |
| IE 2 | 5 | 20 | 5 | 567 | 560 | 15 | 10 |
| IE 3 | 7 | 20 | 3 | 561 | 560 | 15 | 10 |
| CE 5-1 | 7 | 20 | 3 | 561 | 560 | 15 | 20 |
| CE 5-2 | 7 | 20 | 3 | 561 | 560 | 15 | 3 |
| CE 5-3 | 7 | 20 | 3 | 561 | 560 | 30 | 10 |
| CE 5-4 | 7 | 20 | 3 | 561 | 560 | 5 | 10 |
| CE 5-5 | 7 | 20 | 3 | 561 | 560 | 30 | 20 |
| IE 4 | 7 | 20 | 5 | 553 | 550 | 15 | 10 |
| CE 6 | 7 | 20 | 10 | 544 | 540 | 15 | 10 |
| IE 5 | 7 | 30 | 3 | 534 | 535 | 15 | 10 |
| IE 6 | 7 | 30 | 5 | 542 | 540 | 15 | 10 |
| CE 7 | 7 | 30 | 10 | 532 | 530 | 15 | 10 |
| CE 8 | 7 | 40 | 3 | 528 | 530 | 15 | 10 |
| IE 7 | 9 | 20 | 3 | 545 | 540 | 15 | 10 |
| IE 8 | 9 | 20 | 5 | 546 | 540 | 15 | 10 |
| CE 9 | 11 | 30 | 10 | 548 | 550 | 15 | 10 |
| CE 10 | 15 | 25 | 3 | 641 | 640 | 15 | 10 |
| CE 11 | 15 | 25 | 5 | 620 | 620 | 15 | 10 |
| CE 12 | 15 | 25 | 10 | 599 | 600 | 15 | 10 |

IE: Inventive Example
CE: Comparative Example
C of PB: Composition of Plating Bath
T of PB: Temperature of Plating Bath
ET of SS: Inlet Temperature of Steel Sheet
CR: Cooling Rate

TABLE 2

| | Mean Thickness of $MgZn_2$ (μm) | Proportion of Phase of $MgZn_2$ directly on Fe—Al Alloy Phase (%) | Mean Size of $Mg_2Si$ (μm) | Fraction of $Mg_2Si$ in Plating Layer (%) | Ratio of $Mg_2Si$ on Fe—Al Alloy Layer (%) | Thickness of Fe—Al Phase (μm) |
|---|---|---|---|---|---|---|
| CE 1 | 3.8 | 99 | 6.4 | 2.1 | 0.7 | 11.8 |
| CE 2 | 4.1 | 99 | 6.3 | 2.6 | 0.8 | 10.3 |
| CE 3 | 5.7 | 99 | 6.1 | 2.6 | 0.8 | 10.0 |
| IE 1 | 2.7 | 99 | 5.3 | 5.1 | 0.9 | 7.3 |
| CE 4-1 | 1.8 | 83 | 5.3 | 4.8 | 0.9 | 7.9 |
| CE 4-2 | 2.8 | 99 | 2.7 | 2.0 | 0.6 | 7.3 |
| IE 2 | 3.1 | 98 | 5.1 | 5.3 | 1.1 | 7.1 |
| IE 3 | 1.4 | 98 | 5.1 | 5.7 | 1.1 | 6.9 |
| CE 5-1 | 1.0 | 81 | 5.0 | 5.6 | 1.2 | 6.9 |
| CE 5-2 | 3.9 | 98 | 5.1 | 5.8 | 1.0 | 6.9 |
| CE 5-3 | 1.3 | 98 | 2.7 | 2.1 | 0.7 | 6.9 |
| CE 5-4 | 1.4 | 97 | 7.1 | 9.8 | 2.5 | 6.9 |
| CE 5-5 | 1.0 | 87 | 6.8 | 2.3 | 0.6 | 6.9 |
| IE 4 | 1.8 | 98 | 5.0 | 6.0 | 1.3 | 6.7 |
| CE 6 | 3.7 | 96 | 6.1 | 10.1 | 2.8 | 6.7 |
| IE 5 | 2.2 | 98 | 4.8 | 5.7 | 1.0 | 6.5 |
| IE 6 | 2.5 | 98 | 5.0 | 5.9 | 1.2 | 6.4 |
| CE 7 | 5.3 | 96 | 6.2 | 10.3 | 3.0 | 6.4 |
| CE 8 | 4.3 | 87 | 2.8 | 4.4 | 0.9 | 6.4 |
| IE 7 | 2.3 | 97 | 5.1 | 6.0 | 1.1 | 6.5 |
| IE 8 | 1.9 | 97 | 5.1 | 6.2 | 1.3 | 6.4 |
| CE 9 | 5.5 | 88 | 5.2 | 10.1 | 2.5 | 6.6 |
| CE 10 | 3.8 | 89 | 6.3 | 10.0 | 1.3 | 10.1 |
| CE 11 | 3.9 | 88 | 6.2 | 9.5 | 1.4 | 9.8 |
| CE 12 | 5.4 | 86 | 5.8 | 12.3 | 2.1 | 9.8 |

IE: Inventive Example
CE: Comparative Example

TABLE 3

| | Occurrence of LME | Plating Adhesion | Corrosion Resistance Evaluation | Mechanical Properties |
|---|---|---|---|---|
| CE 1 | Not Occurred | Not Separated | Poor | Poor |
| CE 2 | Not Occurred | Not Separated | Poor | Poor |
| CE 3 | Not Occurred | Not Separated | Poor | Poor |
| IE 1 | Not Occurred | Not Separated | Normal | Good |
| CE 4-1 | Occurred | Separated | Normal | Good |
| CE 4-2 | Not Occurred | Not Separated | Poor | Good |
| IE 2 | Not Occurred | Not Separated | Normal | Good |
| IE 3 | Not Occurred | Not Separated | Excellent | Good |
| CE 5-1 | Occurred | Separated | Excellent | Good |
| CE 5-2 | Not Occurred | Not Separated | Excellent | Good |
| CE 5-3 | Not Occurred | Not Separated | Poor | Good |
| CE 5-4 | Occurred | Not Separated | Excellent | Good |
| CE 5-5 | Occurred | Separated | Excellent | Good |
| IE 4 | Not Occurred | Not Separated | Excellent | Good |
| CE 6 | Not Occurred | Separated | Excellent | Good |
| IE 5 | Not Occurred | Not Separated | Excellent | Good |
| IE 6 | Not Occurred | Not Separated | Excellent | Good |
| CE 7 | Not Occurred | Separated | Excellent | Good |
| CE 8 | Occurred | Separated | Normal | Good |
| IE 7 | Not Occurred | Not Separated | Excellent | Good |
| IE 8 | Not Occurred | Not Separated | Excellent | Good |
| CE 9 | Occurred | Separated | Normal | Good |
| CE 10 | Occurred | Separated | Normal | Poor |
| CE 11 | Occurred | Separated | Normal | Poor |
| CE 12 | Occurred | Separated | Normal | Poor |

IE: Inventive Example
CE: Comparative Example

Figure 2:
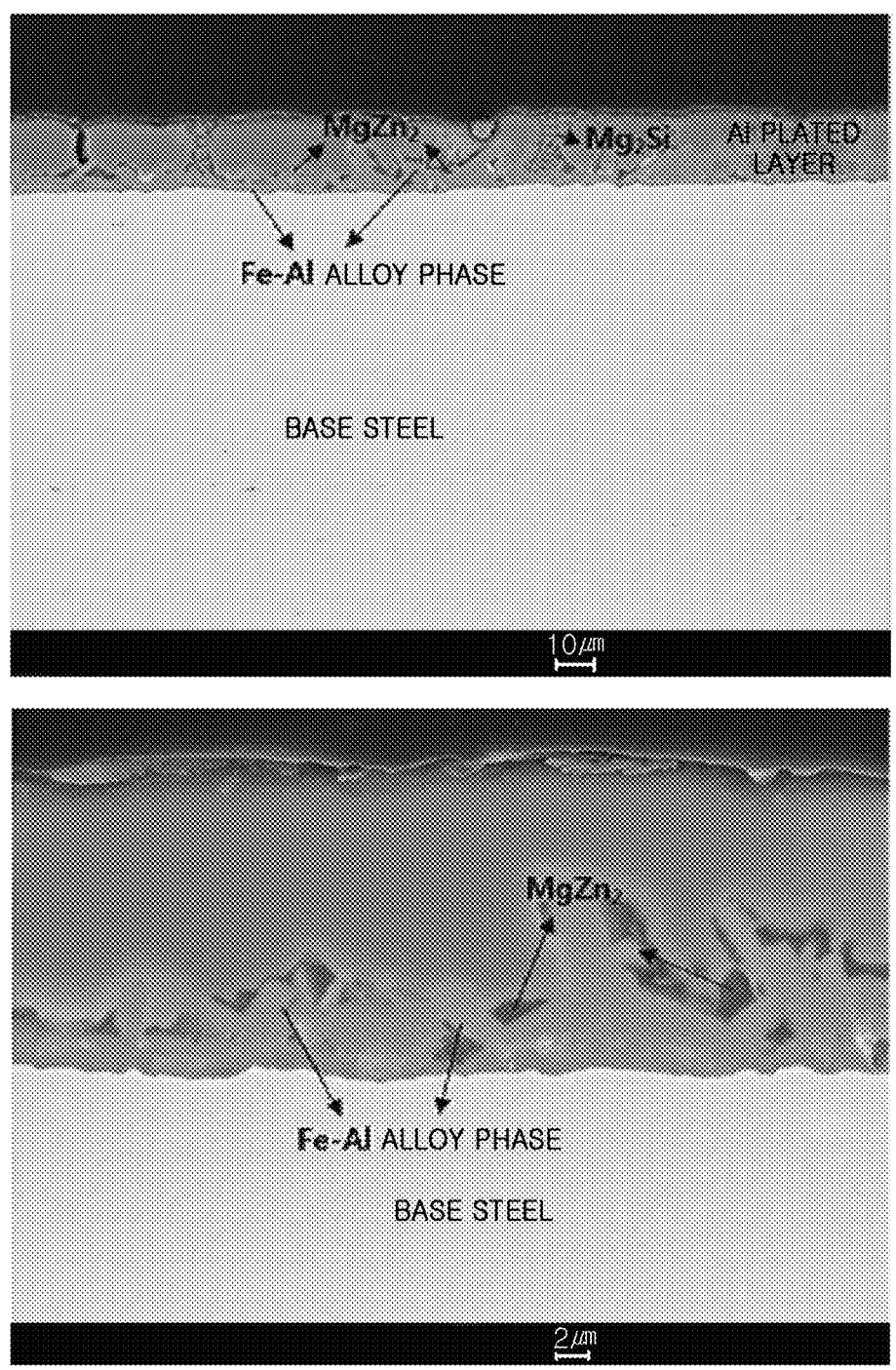
FIG. 2 is an image illustrating a cross-section of a steel sheet manufactured based on Inventive Example 1.

In the case of Inventive Example satisfying the conditions of the present disclosure, LME did not occur and the plating adhesion was also excellent. Moreover, an evaluation result of corrosion resistance was the same as or better than Normal, and mechanical properties were also good. FIG. 1 is a scanning electron microscope (SEM) image, illustrating a cross-section of an aluminum-based hot-dip galvanized steel sheet manufactured based on Inventive Example 3. As illustrated in the drawing, an Fe—Al phase is continuously formed on an interface between a base steel sheet (base steel) and a plating layer, an $MgZn_2$ phase is distributed in a portion directly on the Fe—Al phase, and an $Mg_2Si$ phase is distributed in an upper portion in the plating layer. FIG. 2 is an image illustrating a cross-section of a steel sheet manufactured based on Inventive Example 1.

However, Comparative Examples 1 to 3 were cases in which a content of Si in a plating bath and a plating layer was low. In Comparative Examples 1 to 3, $Mg_2Si$ was not well formed. As a result, it was difficult to secure corrosion resistance due to a low fraction of $Mg_2Si$. Moreover, in the above comparative example, an Fe—Al phase was formed to have a significantly great thickness due to the low content of Si which inhibits alloying reaction, so that plating adhesion was poor. In addition, due to the low content of Si, temperature of the plating bath was 620° C. to 660° C. during welding. As a result, tensile strength of a plated material was relatively lower than tensile strength of a CR material.

In Comparative Examples 4-1 and 4-2, compositions were the same as the composition of Inventive Example 1, but cooling rates of each region were changed. Comparative Example 4-1 is a result of a high cooling rate from 350° C. to 80° C. A ratio of an $MgZn_2$ phase directly on an Fe—Al alloy phase was low because the formation time of the $MgZn_2$ phase was insufficient. As a result, LME occurred and plating adhesion was poor. Comparative Example 4-2 is a result of a high cooling rate from a plating temperature to 350° C. As a result, a mean size of an $Mg_2Si$ phase was ratively small, and a fraction was also low due to the insufficient formation time. Thus, corrosion resistance was not good.

Figure 3:
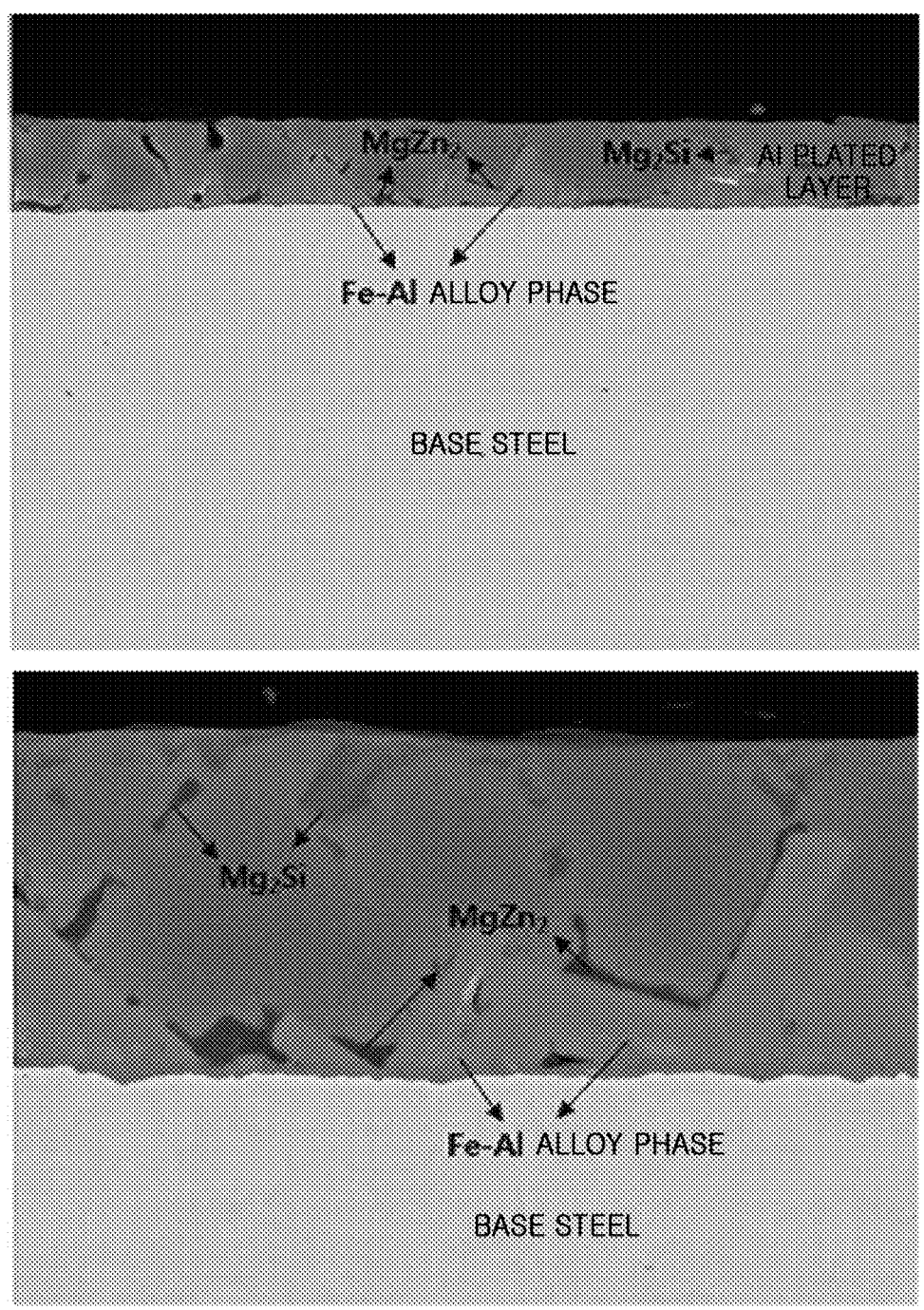
FIG. 3 is an image illustrating a cross-section of a steel sheet manufactured based on Comparative Example 4-3.
Figure 4:
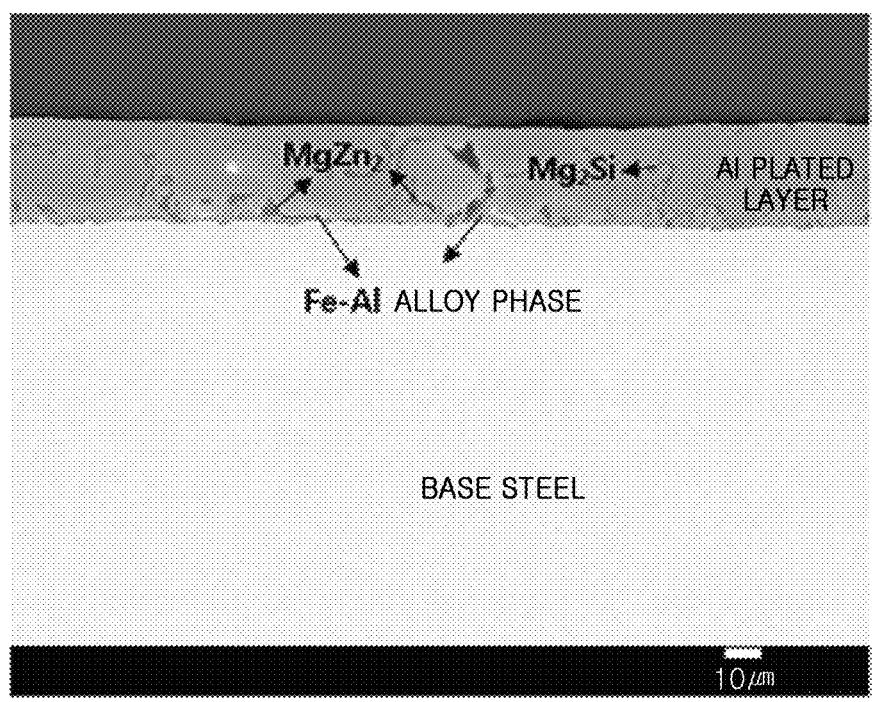
FIG. 4 is an image illustrating a cross-section of a steel sheet manufactured based on Comparative Example 5-4.
Figure 4:
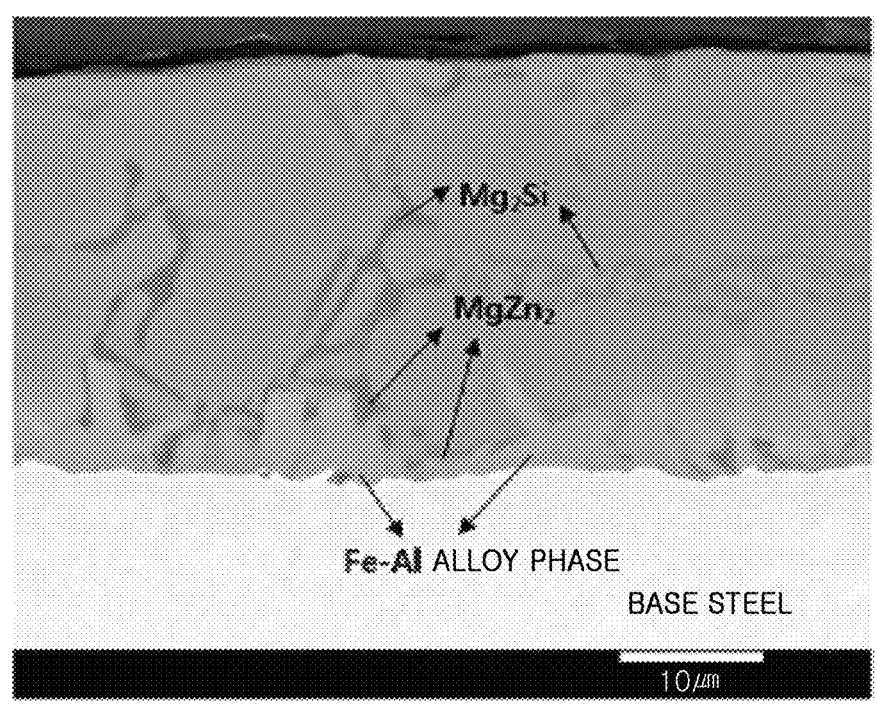

In Comparative Examples 5-1 and 5-5, compositions were the same as the composition of Inventive Example 3, but cooling conditions were different. Comparative Example 1 is a case in which a cooling rate from 350° C. to 80° C. was higher than the range specified in an example embodiment of the present disclosure. In Comparative Example 1, a proportion of an $MgZn_2$ phase directly on an Fe—Al alloy phase was low, so that LME occurred and plating adhesion was not good. In Comparative Example 5-2, a cooling rate from 350° C. to 80° C. was lower than the range specified in an example embodiment of the present disclosure. As a result, in Comparative Example 5-2, an $MgZn_2$ layer was formed to have a relatively great thickness. In such a case, it was confirmed that various physical properties listed in Table 3 were not significantly deteriorated, but workability of a plating layer was deteriorated. Comparative Example 5-3 is a case in which a cooling rate from a plating temperature to 350° C. was higher than the range specified in the present disclosure. As a result, in Comparative Example 5-3, a mean size of an $Mg_2Si$ phase was slightly small and formation time thereof was insufficient, so that a fraction was also low, and thus, corrosion resistance was not good. Comparative Example 5-4 is a case in which a cooling rate from a plating temperature to 350° C. is lower than the range specified in the present disclosure. As a result, in Comparative Example 5-4, an $Mg_2Si$ phase was significantly large, and an area of $Mg_2Si$ phase in contact with an Fe—Al phase was greater than the range specified in the present disclosure. Thus, LME occurred during welding in the steel sheet manufactured based on Comparative Example 5-4. In Comparative Example 5-5, it was not only that a cooling rate from a plating temperature to 350° C. was higher than the range specified in the present disclosure, but also that a cooling rate from 350° C. to 80° C. was lower than the range specified in an example embodiment of the present disclosure. A proportion of an $MgZn_2$ phase directly on an Fe—Al alloy phase was insufficient, and the $Mg_2Si$ phase was coarser than the range specified in the present disclosure. As a result, LME could not be prevented from occurring during welding. Images of cross-sections of the steel sheets, manufactured based on Comparative Example 4-3 and Comparative Example 5-4, are illustrated in FIGS. 3 and 4, respectively.

Comparative Examples 6 and 7 are case in which contents of Mg were significantly high. In this case, an $MgZn_2$ layer was formed to have a great thickness, and $Mg_2Si$ phase was coarse and formed to have a high fraction. In addition, an area ratio of the $Mg_2Si$ phase in contact with an Fe—Al phase was also high. As a result, it was found that plating adhesion was poor.

Comparative Example 8 was a case in which a content of Zn content was significantly high. In this case, LME occurred due to unalloyed Zn. In Comparative Example 9, contents of Si and Zn were significantly high and an Fe—Al thickness was insufficient, so that LME occurred and plating adhesion was not good due to insufficient formation of an Fe—Al alloy phase. Comparative Examples 10 and 11 were cases in which a content of Si was slightly high, and a temperature of a plating bath was 620° C. to 645° C. due to formation of dross, or the like, so that tensile strength of a plated steel sheet was reduced. In addition, in these comparative examples, an $Mg_2Si$ phase was slightly coarse and a fraction was significantly high. As a result, corrosion resistance exhibited a Normal degree. This is because formation of an interfacial alloy phase (the Fe—Al alloy phase) was inhibited due to the high content of Si in the plating bath, so that the MgZn2 layer was significantly ununiformly formed directly on the alloy phase to affect a decrease in corrosion resistance and occurrence of LME due to a low proportion at the surface of base steel. Comparative Example 12 is a case in which a content of Si was significantly high and a slightly large amount of Mg was added. As a result, $Mg_2Si$ was excessively formed, a thickness of an $MgZn_2$ layer was slightly excessive, and a proportion of the $MgZn_2$ layer was low. In such comparative examples, LME occurred, a surface proportion of $MgZn_2$ was low, so that separation of a plating layer occurred, and corrosion resistance was Normal. In addition, a temperature of a plating bath was high, so that tensile strength after plating was significantly reduced.

FIG. 5 is an image of observing results obtained by performing plating adhesion experiments on Inventive Examples and Comparative Examples.

As illustrated in the drawing, in each inventive example satisfying the conditions of the present disclosure, separation of a plating layer was not observed at all. Meanwhile, in Comparative Examples 3, 5, 6, 7 and 8 failing to satisfy the conditions of the present disclosure, separation of a plating layer was observed. A cause of the separation is considered to be inhibition of an Fe—Al phase resulting in non-uniformity and a low proportion of an $MgZn_2$ phase at the surface or excessive formation of $Mg_2Si$.

Accordingly, the advantageous effects of the present disclosure could be confirmed.

The invention claimed is:

1. A highly corrosion-resistant plated steel sheet comprising:
   a base steel sheet; and
   an aluminum based plating layer formed on the base steel sheet, the plating layer having a composition including, by weight, 5 to 10% of Si, 5 to 30% of Zn, and 1 to 7% of Mg,
   wherein the plating layer comprises: an Fe—Al alloy layer formed on the base steel sheet; an $MgZn_2$ layer formed on the Fe—Al alloy layer; and an Al alloy layer formed on the $MgZn_2$ layer,
   wherein a total content of Fe and Al in the Fe—Al alloy layer is 70% by weight or more,
   wherein a proportion of the $MgZn_2$ phase directly on an Fe—Al alloy phase in the plating layer is 90% or more, and
   wherein the proportion is determined as a ratio of an area of the $MgZn_2$ phase to an overall area when observed after a layer formed to be higher than $MgZn_2$ is removed.

2. The highly corrosion-resistant plated steel sheet of claim 1, wherein the plating layer includes an $Mg_2Si$ phase with an area ratio of 10% or less with respect to a total cross-sectional area of the plating layer.

3. The highly corrosion-resistant plated steel sheet of claim 2, wherein an area ratio of an $Mg_2Si$ phase in contact with the Fe—Al alloy layer is 2% or less, and
   wherein the area ratio of the $Mg_2Si$ phase in contact with the Fe—Al alloy layer is determined as a ratio of an area of the $Mg_2Si$ phase to an overall area when observed after a layer, formed to be higher than $Mg_2Si$ contacting with the Fe—Al alloy layer, is removed.

4. The highly corrosion-resistant plated steel sheet of claim 1, wherein the composition of the plating layer further includes, by weight, 0.5% or less (excluding 0%) of Be and Sr in total.

5. The highly corrosion-resistant plated steel sheet of claim 1, wherein the Fe—Al alloy layer has a thickness of 1 μm to 8 μm.

6. The highly corrosion-resistant plated steel sheet of claim 5, wherein the plating layer includes an $Mg_2Si$ phase with an area ratio of 10% or less with respect to a total cross-sectional area of the plating layer.

7. The highly corrosion-resistant plated steel sheet of claim 6, wherein an area ratio of an $Mg_2Si$ phase in contact with the Fe—Al alloy layer is 2% or less, and
   wherein the area ratio of the $Mg_2Si$ phase in contact with the Fe—Al alloy layer is determined as a ratio of an area of the $Mg_2Si$ phase to an overall area when observed after a layer, formed to be higher than $Mg_2Si$ contacting with the Fe—Al alloy layer, is removed.

8. The highly corrosion-resistant plated steel sheet of claim 1, wherein the $MgZn_2$ layer has a thickness of 0.5 μm or more.

9. The highly corrosion-resistant plated steel sheet of claim 8, wherein the plating layer includes an $Mg_2Si$ phase with an area ratio of 10% or less with respect to a total cross-sectional area of the plating layer.

10. The highly corrosion-resistant plated steel sheet of claim 9, wherein an area ratio of an $Mg_2Si$ phase in contact with the Fe—Al alloy layer is 2% or less, and
    wherein the area ratio of the $Mg_2Si$ phase in contact with the Fe—Al alloy layer is determined as a ratio of an area of the $Mg_2Si$ phase to an overall area when observed after a layer, formed to be higher than $Mg_2Si$ contacting with the Fe—Al alloy layer, is removed.

* * * * *